Sept. 8, 1942.  F. ERNY  2,295,172
CONTROL MECHANISM
Filed Nov. 16, 1940  2 Sheets-Sheet 1
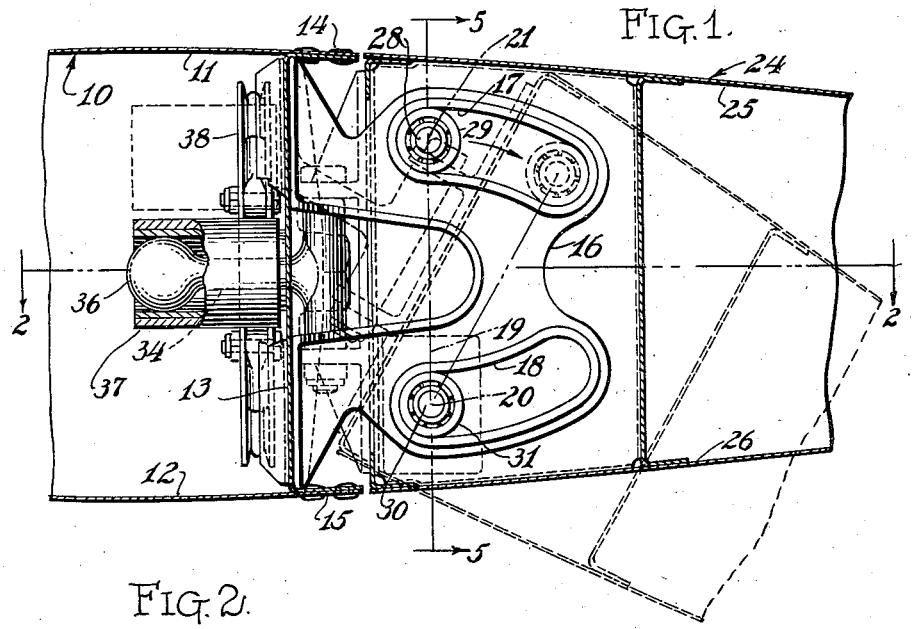
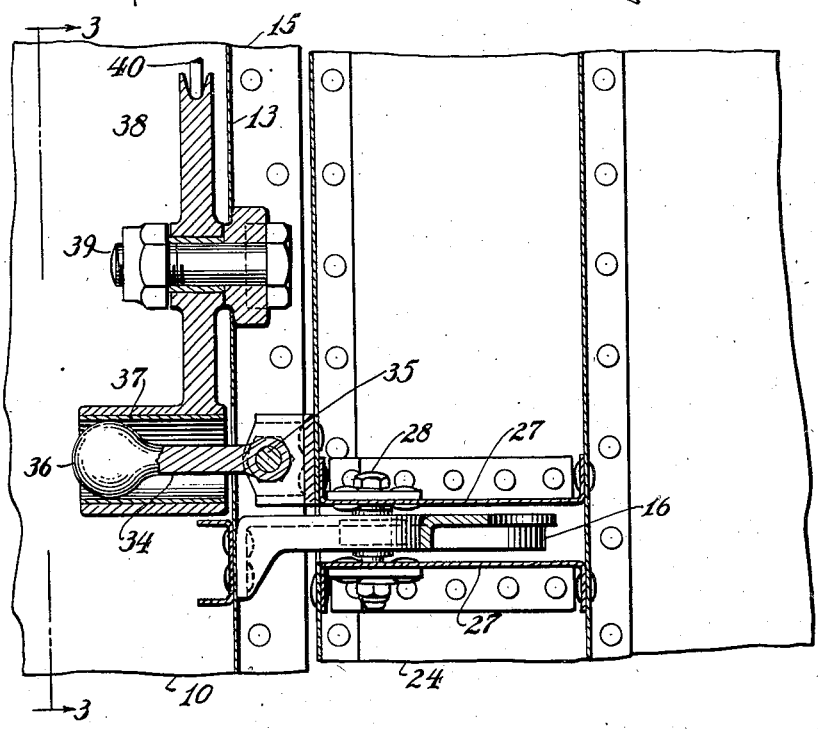
INVENTOR
FRANK ERNY.
BY
ATTORNEY Sept. 8, 1942.　　　　　F. ERNY　　　　　2,295,172
CONTROL MECHANISM
Filed Nov. 16, 1940　　　2 Sheets—Sheet 2
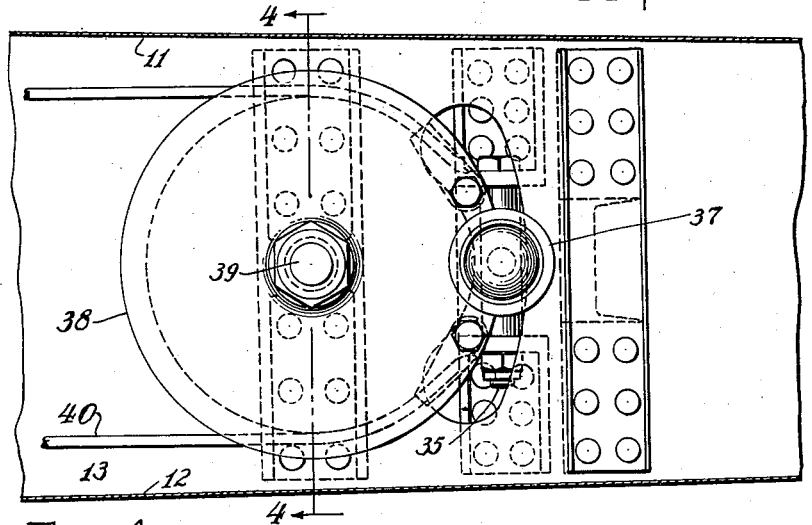
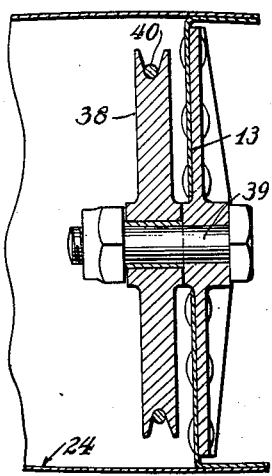
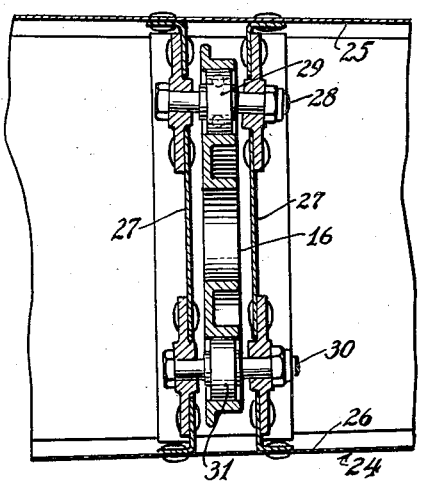
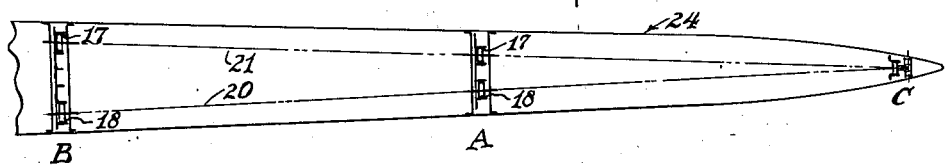
INVENTOR
FRANK ERNY.
BY
ATTORNEY Patented Sept. 8, 1942

2,295,172

UNITED STATES PATENT OFFICE 2,295,172

CONTROL MECHANISM

Frank Erny, Kenmore, N. Y., assignor to Curtiss-Wright Corporation, a corporation of Delaware Application November 16, 1940, Serial No. 365,959

5 Claims. (Cl. 244—90)

This invention relates to aircraft and is concerned with improvements in control airfoil hinges and in operating means for control airfoils.

One of the objects of the invention is to provide a control airfoil hinge system which will maintain a minimum gap between the control airfoil and a fixed wing or airfoil as the control airfoil is moved to either side of a neutral plane.

Another object of the invention is to provide a simple and novel mechanism for swinging the control airfoil about its hinge axes; an associated object is to coordinate the control system with the hinge system to secure a novel, simple and compact mechanism.

Still another object of the invention is to provide, in a tapered wing system, spaced hinges for securing a tapered control airfoil to the tapered wing, the axes of the hinges tapering relative to one another substantially as the wing is tapered.

Further objects of the invention will become apparent in reading the annexed detailed description in connection with the claims, in which:

Fig. 1 is a longitudinal section through fixed and movable airfoils showing the hinge and control system;

Fig. 2 is a sectional plan on the line 2—2 of Fig. 1;

Fig. 3 is a section on the line 3—3 of Fig. 1;

Fig. 4 is a section on the line 4—4 of Fig. 3;

Fig. 5 is a section on the line 5—5 of Fig. 1; and

Fig. 6 is a diagrammatic front elevation of a control airfoil tapered in thickness from its root toward its tip, showing how the dual hinge axes according to the invention may converge in substantial complement to the convergence of the airfoil surfaces across the airfoil span.

Referring first to Figs. 1 to 5, the general form of the hinge and control arrangement is shown as applied to a fixed wing or airfoil 10 having a thick trailing edge, the upper and lower surfaces 11 and 12 of the wing being joined by a transverse bulkhead 13. Said upper and lower surfaces 11 and 12 extend rearwardly of the bulkhead as at 14 and 15. To the bulkhead, a hinge fitting 16 is secured, this fitting in general comprising a fore and aft plate having two arcuate tracks 17 and 18 formed therein. The forward ends of said tracks terminate on a vertical line 19; the arc of the track 17 is struck from a center 20 which is the intersection of the vertical line 19 with the center line of the track 18. The arc of the track 18 is struck from a center 21 which is the intersection of the line 19 with the center line of the track 17. The distance between centers 20 and 21 is indicated as $d$.

A movable airfoil 24 comprises upper and lower surfaces 25 and 26 which form, when the airfoil 24 is in a neutral, fore and aft position, substantial continuations of the fixed airfoil surfaces 11 and 12, the front edges of said surfaces 25 and 26 lying closely adjacent the rear edges of the surfaces 11 and 12. The airfoil 24 carries fore and aft bulkheads 27 one on each side of the fitting 16, these bulkheads supporting a cross bolt 28 on which is journalled a roller 29 engaging the track 17, and carrying a cross bolt 30 on which is journalled a roller 31 engaging the track 18. The roller centers are spaced apart the distance $d$. It will now be apparent that if the airfoil 24 is rocked downwardly from the neutral plane, as shown in Fig. 1, it will pivot about the center 20, and the roller 29 will travel rearwardly in the arcuate track 17. If the airfoil is moved upwardly from the neutral plane from the then current position, the roller 29 will travel back to concentricity with the center 21, and the airfoil will then rock about the center 21, the roller 31 travelling rearwardly in the track 18. Due to the convergence of the tracks 17 and 18, the movable airfoil 24 is constrained against bodily rearward displacement from the fixed airfoil 10, due to the fact that the center distance from 20 to 21 is fixed on both the control airfoil and on the fixed airfoil.

It will be apparent that one skilled in the art could readily transpose the tracks 17 and 18 to the movable airfoil and the rollers 29 and 31 to the fixed airfoil, and likewise, the tracks 17 and 18 could be directed forwardly from the centers 20 and 21 rather than rearwardly as shown.

Referring to the dotted view of the movable airfoil in Fig. 1, it will be apparent that the lower front edge of the surface 26 swings about the center 20 and occupies a position within the confines of the trailing edge of the fixed airfoil, leaving a very small gap between the trailing edge of the lower fixed airfoil surface 12 and the lower surface of the movable airfoil. Also, the gap between the upper trailing edge of the fixed airfoil and the upper leading edge of the movable airfoil will be much less than would obtain if a single hinge were to be used between the two airfoils.

To swing the movable airfoil 24 about its hinge system, I provide a link or horn 34 pivoted to the airfoil 24 on a hinge 35 whose axis is substantially perpendicular to the chordal plane of the movable airfoil, whereby the link 34 must move about the hinge 35 with the movable airfoil but may move laterally or spanwise with respect to the airfoil. The link passes through an opening in the wall 13, and the front end of the link 34 is formed with a ball end 36, embraced by a sleeve 37 within which said ball end may slide forwardly and rearwardly. The sleeve 37 forms part of a pulley 38 journalled on a shaft 39 secured to the inside of the bulkhead 13. The axes of the sleeve 37 and of the shaft 39 are parallel and run in a fore and aft direction, normal to the hinge axes 20 and 21. A suitable cable or its equivalent, shown at 40, is reeved around the pulley 38 and is carried to an appropriate control member. As is apparent from Fig. 3, rotation of the pulley 38 carries with it the ball end 36, forcing the link 34 and the airfoil 24 to move up or down about the airfoil hinge, during which movement the link 36 may swing freely in a spanwise direction about its hinge 35.

Reference may now be made to Fig. 6 which shows diagrammatically the airfoil 24 in front view, the zone A being the region in which the elements of Figs. 1 to 5 are disposed. The airfoil 24 is shown as being tapered in thickness from left to right and to coordinate the double hinge axis arrangement of the invention with this taper, the hinge axes 20 and 21 may lie substantially parallel with and close to the lower and upper surfaces of the airfoil, whereby the hinge axes 20 and 21 converge from a wide spacing at zone B to an intersection at zone C. If a plurality of hinge fittings are to be used throughout the airfoil span, such as at zones A, B, and C, the tracks 17 and 18 at zone B are spaced wider apart and are struck on arcs equivalent to the spacing between the axes 20 and 21 at the zone. At zone A, the system is as shown in the other figures while at zone C no tracks are necessary but a single hinge system of conventional pattern may be utilized. It is contemplated that only a single form or link such as 34 need be used for the whole control airfoil.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an airfoil system tapered spanwise in thickness, a fixed airfoil having a substantially flat trailing edge normal to the airfoil chord plane, hinge means defining two hinge axes one close to one side of the airfoil trailing edge and one close to the other side of the airfoil trailing edge, said hinge axes converging toward one another, spanwise, in accordance with the taper of the airfoil system, a spanwise tapered control airfoil having devices engaging said hinge means, mechanism to move the airfoil upon said hinge means, and reliefs at said hinge means to allow of control airfoil movement to one side of neutral about the hinge axis closest to the one side, and to allow of control airfoil movement to the other side of neutral about the other hinge axis closest to the other side.

2. In an airfoil system, a fixed wing having a recessed trailing edge defining at its border a polygon normal to the wing chord plane, a movable control airfoil having a substantially flat similarly polygonal leading edge normal to the airfoil chord plane, said edges lying adjacent one another, a series of alined fulcrums along each border of the trailing edge, means along the borders of the leading edge engaging said fulcrums, and means to swing the control airfoil to one side of neutral on one series of fulcrums and to the other side of neutral on the other series of fulcrums, portions of the leading edge, during such swinging, entering into the recessed trailing edge of the fixed wing.

3. In an airfoil system, a fixed wing having a recessed trailing edge defining at its border a polygon normal to the wing chord plane, a movable control airfoil having a substantially flat similarly polygonal leading edge normal to the airfoil chord plane, said edges lying adjacent one another, a series of alined fulcrums along each border of the trailing edge, means along the borders of the leading edge engaging said fulcrums, and means to swing the control airfoil to one side of neutral on one series of fulcrums and to the other side of neutral on the other series of fulcrums, portions of the leading edge, during such swinging, entering into the recessed trailing edge of the fixed wing, the axes of said fulcrum series tapering toward one another and said wing and airfoil tapering in the thickness throughout their spans in corresponding degree.

4. In aircraft, a fixed forward airfoil, a movable rearward airfoil, the forward part of the movable airfoil lying adjacent to the rearward edge of the fixed airfoil, a hinge unit between said airfoils including two hinge pins on the movable airfoil, one pin lying adjacent the airfoil top surface and the other lying adjacent the airfoil bottom surface, said hinge unit including a fitting on the fixed airfoil having arcuate slots within which said pins engage, whereby upon down airfoil movement the lower pin comprises the hinge pin and upon up airfoil movement the upper pin comprises the hinge pin, the hinge pins being disposed in the airfoil so that the upper and lower surfaces of the fixed and movable airfoils have substantially no gap therebetween and substantially no foreshortening of airfoil effective chord length as the movable airfoil is moved, respectively, up and down.

5. A movable-airfoil-to-fixed-airfoil hinge joint wherein the airfoils at the joint have substantial thickness comprising separate hinge pins located one adjacent to one surface of and the other adjacent to the opposite surface of one said airfoil, means carried by the other said airfoil with which said hinge pins are adapted to cooperate, said movable airfoil being movable in one direction about one said hinge pin to maintain minimum gap at one side of said hinge joint and being movable in the opposite direction about the other said hinge pin to maintain minimum gap at the opposite side of said hinge joint, and means operable to so move said movable airfoil.

FRANK ERNY.